INVENTOR
DAVID C. TRIMBLE

BY Cushman, Darby & Cushman
ATTORNEYS

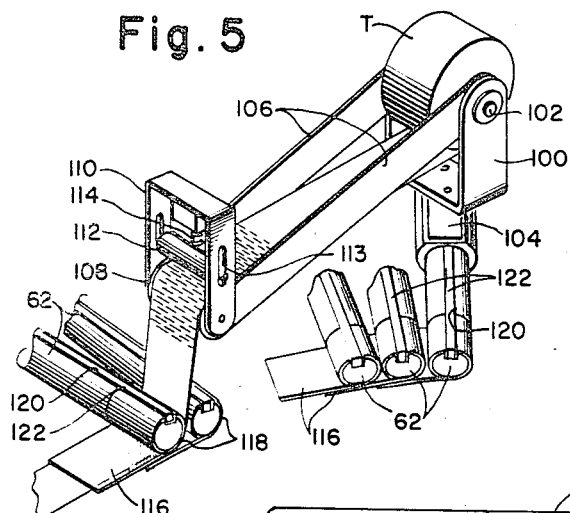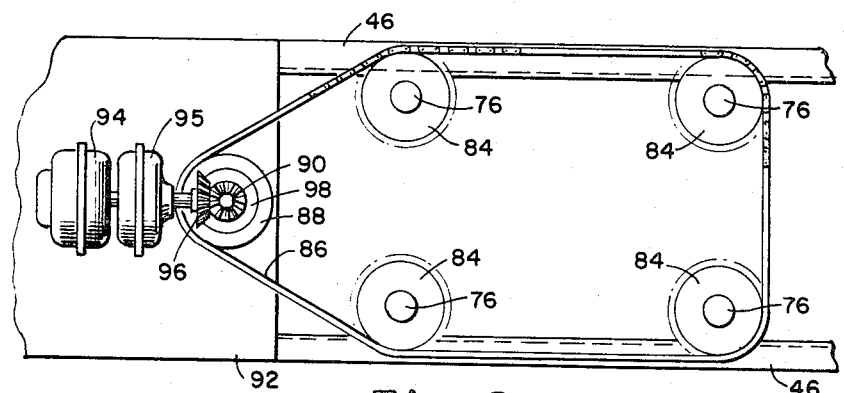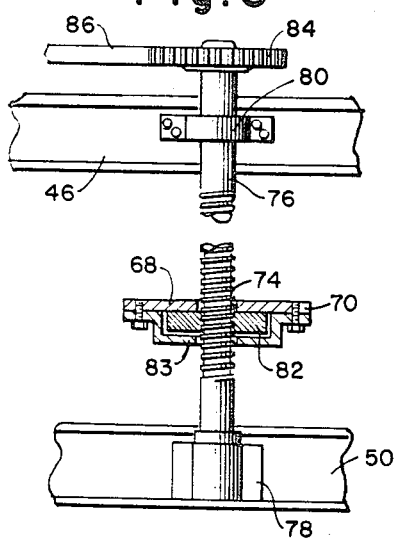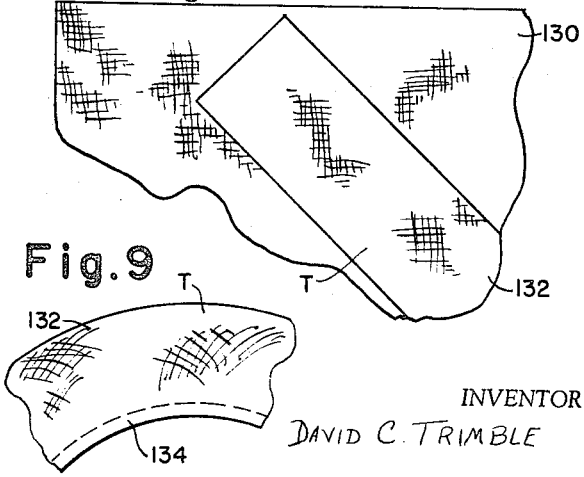

Sept. 17, 1968   D. C. TRIMBLE   3,402,091
METHOD AND APPARATUS FOR FORMING HOLLOW STRUCTURES BY
HELICALLY WINDING STRIPS ON EDGE UNDER PRESSURE
Filed Dec. 21, 1959   4 Sheets-Sheet 4

INVENTOR
DAVID C. TRIMBLE

BY Cushman, Darby & Cushman
ATTORNEYS

3,402,091
METHOD AND APPARATUS FOR FORMING HOLLOW STRUCTURES BY HELICALLY WINDING STRIPS ON EDGE UNDER PRESSURE

David C. Trimble, Wilmington, Del., assignor, by mesne assignments, to Haveg Industries, Inc., a wholly-owned subsidiary of Hercules Incorporated, New Castle, Del., a corporation of Delaware
Filed Dec. 21, 1959, Ser. No. 860,898
12 Claims. (Cl. 156—425)

This invention relates to the formation of hollow articles and more partticularly to an improved method and apparatus for forming hollow articles by helically winding a thin, flat tape of fibrous material impregnated with a resin about a forming mandrel and the tape employed in making the hollow article.

The term "hollow article" as herein used comprehends within its meaning the structure formed by winding tape of the type hereinafter described in helical formation and subsequently processing the same in the manner hereinafter described, irrespective of whether the structure about which the helical windings are formed is subsequently removed, retained or replaced.

Hollow articles made in accordance with the present invention may be employed for any purpose. However, the articles of the present invention are particularly adapted for use in forming internal and external rocket parts and the like, including parts of the type disclosed in Ward Patent 2,835,107 issued May 20, 1958. As disclosed in the Ward patent, rocket components which are operatively subjected to temperatures above 2,000° F. can be conveniently made from a combination of inorganic fibers and thermosetting synthetic resin. By utilizing such a material the rocket part is highly resistant to disintegration as a result of excessive temperatures to which it may be subjected during flight.

It has been found that by orienting the fibers in the resin which form the hollow artticle or body in transverse layer formation, the resistance not only to temperature but to disintegration as a result of other forces is greatly enhanced. To this end, the present invention provides a method of forming hollow articles of the type described in the Ward patent in which a tape of fibrous material impregnated with resin is helically wound about a mandrel. The tape is formed so that it provides one longitudinal marginal edge portion which is resistant to longitudinal expansion or stress, the remaining portion of the tape being expansible in response to longitudinal stress. The tape thus formed can be conveniently wound on a mandrel so that the substantially non-expansible marginal edge portion contacts the surface of the mandrel and the remaining portion of the tape arcuately fans out by longitudinal expansion. The tape thus wound on the mandrel is then placed under pressure to fuse together the resin impregnated in the layers of tape. After fusing under pressure and heat in most cases, the article which comprises a body of cured resin having a substantially continuous helically-wound tape of fibrous material imbedded therein, can then be machined to proper dimensions.

Accordingly, it is an object of the present invention to provide an improved method for forming hollow articles by helically winding a tape of fibrous material impregnated with a resin about a mandrel and then subject the wound tape to pressure to form the article.

Another object of the present invention is the provision of a method of the type described in which the tape is impregnated with a curable thermosetting resin and is cured after winding on the mandrel under heat and pressure.

Another object of the present invention is the provision of an apparatus of the type described having means for winding a tape helically about a mandrel and means for effecting such winding about mandrels which vary in cross-sectional configuration throughout their longitudinal extent.

Still another object of the present invention is the provision of an improved roll or coil of material for forming a hollow artticle, which material comprises a tape having one marginal edge portion thereof which is resistant to longitudinal stress and a remaining portion thereof which is capable of expanding in response to longitudinal stress.

Still another object of the present invention is the provision of a hollow article which is resistant to temperatures above 2,000° F.

These and other objects of the present invention will become more apparent during the course of the following detailed descritpion and appended claims.

The invention may best the understood with reference to the accompanying drawings wherein an illustrative embodiment is shown.

In the drawings:

FIGURE 3 is an enlarged fragmentary side elevational view, partly in section, illustrating the means for raising and lowering the tape-handling carriage relative to the mandrel;

FIGURE 4 is a fragmentary top plan view showing the manner in which the carriage-moving means is driven;

FIGURE 5 is a fragmentary perspective view illustrating the tape-feeding means of the apparatus and the manner in which the tape is fed onto the mandrel of the apparatus;

FIGURE 8 is a fragmentary top plan view of a piece of fabric illustrating the manner in which a tape can be cut on the bias therefrom;

FIGURE 9 is a fragmentary top plan view of the bias-cut tape embodying the principles of the present invention showing the same in the position it assumes after it has been wound on the mandrel;

Figure 1:
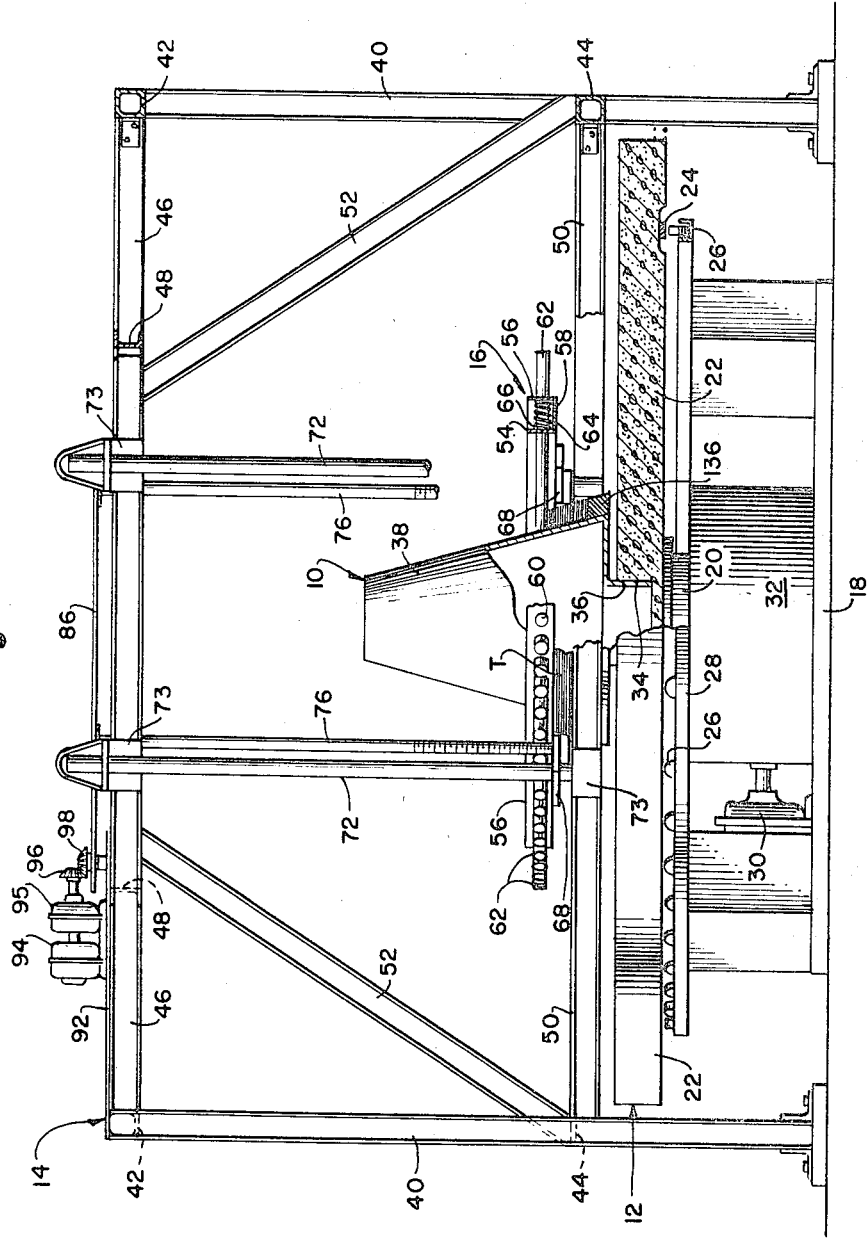
FIGURE 1 is a side elevational view, partly in section, of an apparatus embodying the principles of the present invention.

Referring now more particularly to the drawings, there is shown in FIGURE 1 an apparatus embodying the principles of the present invention which include a mandrel generally indicated at 10, arranged to be received on and supported by a rotatable carriage construction, generally indicated at 12. Fixedly mounted in surrounding relation to the carriage structure 12 is a rigid frame, generally indicated at 14, which carries a tape-handling mechanism, generally indicated at 16.

The mandrel supporting carriage structure 12 may be of any suitable construction and, as shown, includes a base 18 which may be suitably supported on the floor, the base having a central shaft 20 extending upwardly therefrom and connected with a rotary table or platform 22. The platform preferably includes a lower track 24 arranged to engage a series of circumferentially-spaced rollers 26 or the like, suitably carried on an annular track or channel 28, fixedly mounted with respect to the base 18. Any suitable means may be provided for effecting a rotary movement of the table 22 and, as shown, there is provided an electric motor 30 which is drivingly connected to the shaft 20 by a suitable variable speed drive transmission schematically illustrated at 32 in FIGURE 1.

The central portion of the platform 22 is suitably apertured, as indicated at 34, for receiving the lower end of the mandrel 10. The engagement of the mandrel within the aperture 34 is such that the mandrel is drivingly connected with the platform and for this purpose any suitable means may be employed as, for example, a key, set screws, or the like. As shown, the opening 34 is angular in cross-section and the mandrel 10 includes a depending portion 36 of corresponding angular cross-section which fits within the opening 34. The mandrel itself includes an exterior forming surface 38 which may be of any desired annularly convex configuration. As shown in FIGURE 1, the forming surface of the mandrel 10 is frusto-conical in configuration. The only requirement for the surface 38 of the mandrel is that it can not present an exterior surface which is concave in horizontal cross-section. Thus, it is not required that the exterior surface be circular in cross-section and, of course, the cross-sectional configuration can vary throughout the longitudinal extent of the mandrel.

The frusto-conical mandrel 10 shown in FIGURE 1 is arranged to form a frusto-conical hollow article and thus, in operation, is removed from the article after formation for use in forming other articles. It will be understood that the term "mandrel" as herein used also comprehends the use of bodies upon which the tape is wound and permanently retained, as when applying a coating of tape around a body.

The frame 14 may be of any desired construction and, as shown, includes four vertical frame members 40 positioned in circumferentially-spaced relation about the platform 22. Extending between each pair of vertical frame members on opposite sides of the platform 22 is an upper frame member 42 and a lower frame member 44. A pair of upper horizontally extending frame members 46 are rigidly secured between the upper frame members 42 at a position spaced inwardly from the associated vertical frame members 40, the horizontal frame members 46 being strengthened by suitable cross braces 48. In like manner, a pair of lower horizontal frame members 50 are rigidly secured between the lower transverse frame members 44 in a position spaced inwardly from the associated vertical frame members 40. If desired, vertically extending diagonal brace bars 52 may be provided which extend between lower frame members 44 adjacent the inner ends of the lower horizontal frame members 50 and the upper horizontal frame members 46.

The tape-handling mechanism 16 includes an annular member comprising a pair of inner and outer concentric rings 54 and 56 rigidly secured together by means of an integral bottom disk 58. Formed in the concentric rings 54 and 56 is a plurality of circumferentially-spaced, radially-aligned openings 60 for receiving a plurality of circumferentially-spaced elongated bars or members 62. Each of the members 62 is slidably mounted within a pair of aligned openings 60 and extends radially inwardly in a direction toward the axis of the mandrel 10. A coil spring 64 is provided for each of the elongated members 62 for resiliently urging the latter toward the mandrel. To this end, each of the elongated members includes a collar 66 adjustably fixed to the member in a position between the inner and outer rings 54 and 56. Each coil spring 64 is positioned in surrounding relation to the outer end of the associated elongated member and has one end in engagement with the interior surface of the outer ring 56 and its opposite end in engagement with the associated collar 66.

The inner and outer rings 54 and 56 are mounted on the frame 14 for vertical movement with respect to the mandrel 10 i.e. longitudinal movement with respect to the mandrel axis. To this end, a plurality of circumferentially-spaced apertured lugs 68 are rigidly secured to the outer ring 56. Each of the lugs includes a first guide aperture 70 which receives a vertical guide rod 72 extending between the upper and lower horizontal frame members 46 and 50 and fixed thereto as by brackets 73. In addition, each of the lugs 68 is provided with a second inwardly-spaced aperture 74 for receiving a threaded shaft 76. As best shown in FIGURE 3, the lower end of each shaft 76 is suitably journaled, as by bearing 78, on an associated lower horizontal frame member 50 and the upper end portion thereof is journaled, as by bearing 80, on the associated upper horizontal frame member 46. Mounted on each threaded shaft 76 in threaded engagement therewith is a nut 82 which is secured, as by plates 83, to the associated lug 68 adjacent the lower surface thereof preferably for limited universal movement.

As best shown in FIGURES 3 and 4, the upper end of each of the threaded shafts 76 extends above the associated bearing 80 and frame member 46 and has a sprocket wheel 84 fixedly attached thereto. The threaded shafts 76 are rotated in unison by any suitable means such as a sprocket chain 86 trained about all of the sprocket wheels 84 and a fifth driving sprocket wheel 88 mounted on the central portion of a vertical stub shaft 90 suitably journalled at its lower end on a mounting plate 92 secured to the upper horizontal frame members 46. Any suitable means may be provided for driving the sprocket wheel 88 and, as shown, such means includes an electric motor 94 mounted on the plate 92 and having a reversible variable speed drive transmission 95 connected therewith. A bevel gear 96 is fixed to the output shaft of the drive transmission 95 and meshes with a cooperating bevel gear 98 fixed to the upper end of the shaft 90.

It will be understood that the tape-handling mechanism 16 also includes means for feeding a roll of tape T onto the mandrel in response to the rotational movement thereof, the tape contacting the surface 38 of the mandrel along one longitudinal edge thereof and forming thereon a spiral layer formation. As best shown in FIGURE 5, the tape-feeding means may include a U-shaped bracket 100 having a removable shaft 102 extending between the legs thereof for receiving the roll of tape. The bracket is preferably secured to one of the elongated elements, by any suitable means, such as an attaching sleeve 104. Extending outwardly from the U-shaped bracket is a pair of rigid arms 106 having a roller 108 journaled between the outer ends thereof. An inverted U-shaped yoke 110 is rigidly fixed to the outer end of the arms 106 and a cooperating feed roller 112 is carried by the yoke 110 for movement toward and away from the roller 108 as by slots 113. Preferably a coil spring 114 is connected between the roller 112 and the yoke 110 to resiliently urge the latter into engagement with the roller 108. It can be seen from FIGURE 5 that the tape extending from the roll is passed between the rollers 112 and 108 and then downwardly between the inner ends of a pair of elongated members 62.

In order to guide the tape into proper relation about the mandrel, a shoe element 116 is mounted on the inner end of each of the elongated members 62. Each shoe element comprises a flat strip of metal having one end thereof bent to conform with the inner end of the associated elongated member 62, as indicated at 118. Any suitable means may be provided for securing the bent end portion of the shoe element to the associated elongated member 62 and, as shown, each member 62 is provided with an elongated groove or keyway 120 within which the extremity of the shoe element is engaged. An elongated key 122 serves to secure each shoe element to the associated elongated member. As can be seen from FIGURE 5, the flat portion of each shoe element 116 is of sufficient length to overlap the flat portion of the shoe element secured to the adjacent elongated member.

The tape T from between the cooperating rollers 108 and 112 extends downwardly between two adjacent elongated members and then is fed between adjacent overlapping shoe elements. The overlapping flat portions of the shoe elements secured to the inner ends of all of the elongated members provide continuous support or longitudinal pressure on the tape as it is wound about the rotating mandrel.

It will be noted that since the tape is fed to the mandrel with one longitudinal edge portion thereof in contact with the surface 38 of the mandrel and the remaining portion of the tape extending in a direction generally perpendicular to the axis of the mandrel, it becomes necessary to arcuately fan out the remaining portion of the tape so as to wind the same in helical formation. In order to permit this fanning out operation, the present invention provides a novel form of tape. The essential conditions of the tape are that it have one longitudinal edge portion which is nonexpansible or resistant to longitudinal stress, with the remaining portion of the tape being expansible in response to longitudinal stress. It should be borne in mind that the provision of the nonexpansible longitudinal edge portion is essential to the proper feeding of the tape onto the mandrel, since such feeding is accomplished under tension due to the rotation of the mandrel. By providing one longitudinal edge which is resistant to expansion under such tensile forces and a remaining portion which is expansible under such tensile forces, the tape is automatically arcuately fanned out as it is wound onto the mandrel by rotation of the latter. The flat portions of the shoe elements serve to maintain the tape in a single plane during this arcuate expansion as the tape is wound on the mandrel.

Figure 7:
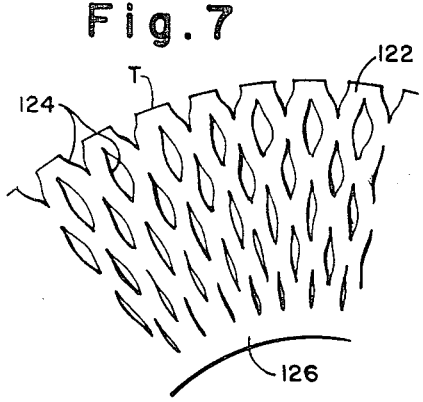
FIGURE 7 is a view similar to FIGURE 6 showing the tape in the form it assumes after it has been wound on the mandrel.
Figure 6:
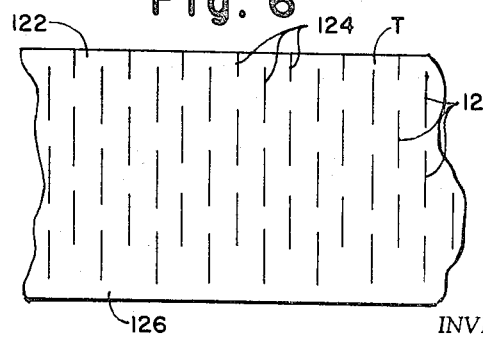
FIGURE 6 is an enlarged fragmentary top plan view of one form of a tape embodying the principles of the present invention showing the same in the form in which it is fed to the mandrel.

One form of a tape T which embodies the principles of the present invention is shown in FIGURES 6 and 7 and indicated by the numeral 122. The tape is made of a fibrous material which may be either of interwoven strands of fibers or fibers united together in a manner similar to the manner in which the fibers of paper products are united together. The fibers themselves may be of any suitable material such as textile fibers, asbestos, etc. As textile fibers there can be employed fibers such as wool, glass, nylon, cotton, polyesters, acrylonitrile fibers, polyvinyl esters, polyolefins, e.g. polyethylene and polypropylene, polycarbonates, crosslinked fibers such as irradiated polyethylene, or peroxide cured polyethylene. Of course, where the tape is made of interwoven strands, the strands themselves may be made up of a plurality of fibers of the types described above.

The fibrous material is then impregnated with a resin, preferably a curable thermosetting resin. Examples of resins which may be utilized for this purpose are phenol-formaldehyde resins. Thus there can be used a one-stage, alkali catalyzed phenol-formaldehyde resin as well as a two-stage phenol-formaldehyde condensate wherein a novolak, for example, is sured to the finished state by addition of a catalyst or curing agent such as formaldehyde source, e.g., paraformaldehyde, hexamethylenetetramine or trioxane. For example, to a novolak made from 1 mol of phenol and 0.83 mol of formaldehyde there can be added 15% by weight of the resin of hexamethylenetetramine as a curing agent.

Other thermosetting phenolic resins can also be used, e.g., phenol-furfural, m-cresol formaldehyde, cresylic acid formaldehyde, xylenol formaldehyde, such as 3,5-dimethylphenol formaldehyde, as well as mixed xylenol formaldehyde resins, resorcinol-formaldehyde, etc. Furthermore, other thermosettings resins can be employed such as urea-formaldehyde resin, aminotriazinealdehyde resins, e.g. melamine-formaldehyde, furfuryl alcohol resins, furfuryl alcohol formaldehyde resins, furfuryl alcohol furfural resins, polyesters, silicones, etc. Epoxy resins can also be employed.

The epoxy resins suitable for use in the compositions of the invention include, for example, those described in U.S. Patents Nos. 2,528,417, of Oct. 31, 1950, and 2,500,449 of Mar. 14, 1950.

A preferred group of epoxy ethers for use in the invention is prepared by reacting a dihydric phenol with epichlorhydrin in alkaline solution. These products are of resinous character and in general are solid materials at normal temperature (20°–30° C.). Any of the various dihydric phenols are used in preparing the glycidyl ethers, including mononuclear phenols like resorcinol, catechol, hydroquinone, etc., or polynuclear phenols like bis-(4-hydroxyphenyl)-2,2-propane(bis-phenol), 4,4'-dihyrdoxy benzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(hydroxy-2-tertiary butyl-phenyl)-2,2-propane.

There can also be used 1,2-epoxy-containing polyethers of polyhydric alcohols, such as polyglycidyl ethers thereof, like the diglycidyl ether of ethylene glycol, propylene glycol, trimethylene glycol, diethylene glycol, triethylene glycol, glycerol, dipropylene glycol, and the like. Other typical ethers of this class include glycidyl ethers of polyhydric alcohols having a 1,2-epoxy equivalent greater than the one, such as the polyglycidyl ethers of glycol, diglycerol, erythritol, pentaglycerol, mannitol, sorbitol, polyallyl alcohol, polyvinyl alcohol, and the like.

In general, the glycidyl ether resin will have an epoxy equivalency greater than 1 and usually less than 2.

Resins such as polymerized triallyl cyanurate resins, diethylene glycol bisallyl carbonate resins and diallyl phthalate resins can be used. Polyester resins can also be used. These polyester resins contain two major components, a linear unsaturated polyester and a polymerizable vinyl (or vinylidene) monomer which dissolves in the polyester and is subsequently polymerized along with the completion of the cure of the polyester. The polyester can be made from glycols such as ethylene glycol, diethylene glycol, propylene glycol, dipropylene glycol, 2,3-butanediol, 1,3-butanediol, trimethylene glycol and unsaturated disbasic acids such as maleic acid, fumaric acid, cis-3,6-endomethylene-$\Delta^4$-tetrahydrophthalic acid, hexachloroendomethylene tetrahydrophthalic acid, itaconic acid, citraconic acid, etc. A portion of the unsaturated acid can be replaced by saturated aliphatic or aromatic dibasic acids such as succinic acid, adipic acid, azelaic acid, sebacic acid, phthalic acid and tetrachlorophthalic acid. As the vinyl or vinylidene monomer component there can be used styrene, the vinyl toluenes, e.g., o-vinyl toluene, alpha-methyl styrene, triallyl cyanurate, diallyl phthalate, methyl methacrylate, vinyl acetate, o-chlorostyrene, o-fluorostyrene, and 3,5-dichlorostyrene. A typical example of such a polyester resin is a styrene modified condensation product of propylene glycol with a mixture of phthalic anhydride and maleic anhydride.

Alkyd resins can be used, such as the esters of phthalic acid, maleic acid, terephthalic acid, isophthalic acid, adipic acid, trimellitic acid or fumaric acid with glycerol, pentaerythritol, sorbitol, trimethylol propane or the like with or without the addition of a modifier such as ethylene glycol, butylene glycol, etc. When the acid has at least three carboxyl groups, all of the alcohol can be dihydric.

Other curable resins include cross-linked polyolefins such as cross-linked polyethylene and polypropylene. The curing or cross-linking can be accomplished by the use of peroxides, e.g. benzoyl peroxide, or irradiation. In general the irradiation will be to an extent of at least $2 \times 16^6$ rep but can be as high as 100×10⁶ rep or even 200×10⁶ rep. Satisfactory irradiation techniques are disclosed in Rainier Patent 2,877,500.

The tape of fibrous material impregnated with resin is of the type which would normally be resistant to longitudinal expansion throughout its width. In order to provide for such expansion therein except for one longitudinal edge portion, the tape is cut to form therein a plurality of parallel rows of spaced aligned transversely-extending slits 124. As is clearly shown in FIGURE 6, the slits of each row overlap the spaces between the slits of the adjacent row. Moreover, the slits of the rows are positioned in the width of the tape so than one longitudinal marginal edge portion 126 remains uncut. The opposite longitudinal marginal edge portion has at least some of the slits of the parallel rows disposed therein and extending inwardly therefrom. Thus, the longtitudinal marginal edge portion 126 of the tape 122 provides resistance to elongation under longitudinal tension or stress and is therefore substantially non-expansible Inder longitudinal tensile load. The remaining portion of the tape within which rows of slits 124 are disposed is capable of expanding in response to longitudinal tensile forces or stress.

With the arrangement of slits shown in FIGURE 6 and described above, the tape can be easily fanned out arcuately in its own plane as it is wound about the mandrel. Thus, because of the overlapping of the slits with respect to the spaces between the slits of the adjacent rows, the portion of the tape within which the slits are disposed is capable of expanding in a manner similar to expanded metal. During expansion the slits become opened a progressively greater amount in a direction away from the non-expansible longitudinal edge portion 126 as is clearly illustrated in FIGURE 7.

It will be noted that with the use of the tape 122 as shown in FIGURES 6 and 7, there will be a greater amount of material provided by the inner surface of the tape wound about the mandrel than the outer surface thereof, due to the existence of the opened slits adjacent the outer surface. In order to compensate for this variance in the amount of material from the inner periphery of the wound tape to the outer periphery thereof, filler rolls of tape (indicated at F in phantom lines in FIGURE 2) slit in the same manner illustrated above may be fed to the mandrel in a position spaced outwardly from the exterior surface thereof. Inward slippage is effectively prevented at such an outward feed position due to the frictional forces between the tape and the shoes.

Figure 2:
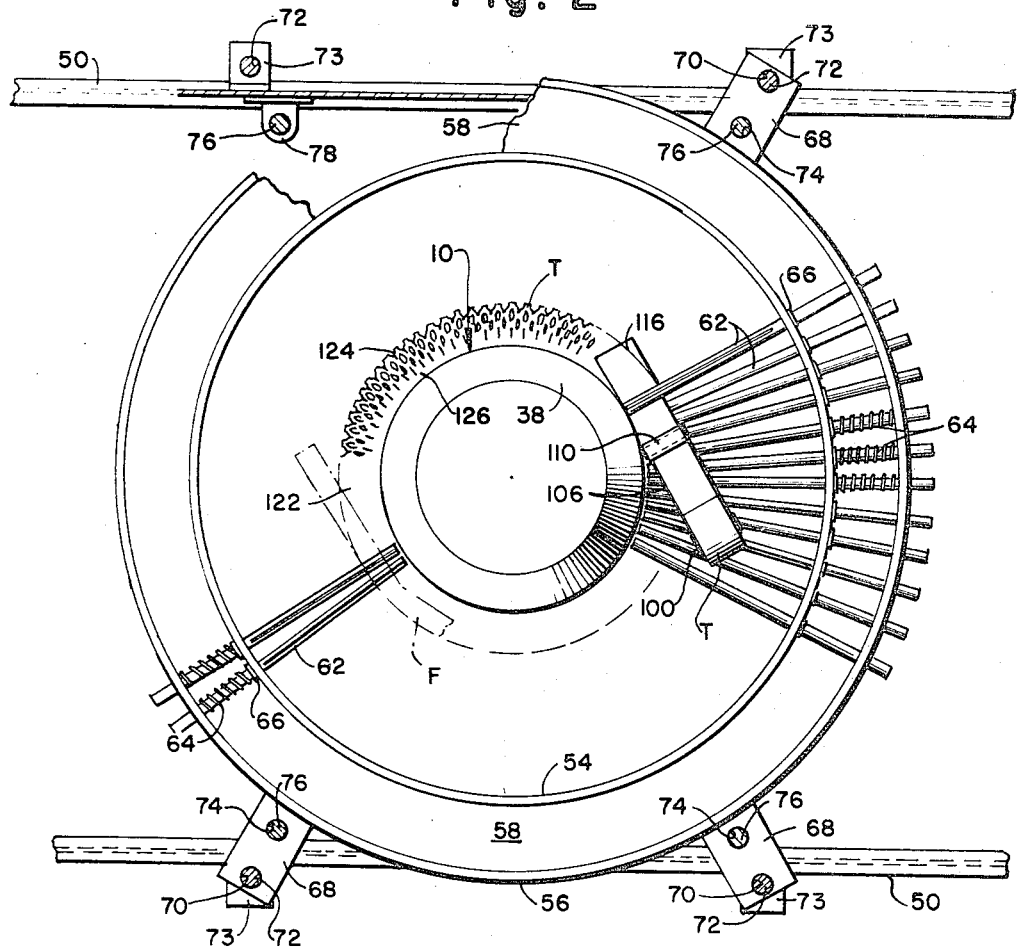
FIGURE 2 is a fragmentary top plan view of the tape-winding structure of the apparatus.

It will also be understood that while a single roll of tape T is illustrated as being wound on the mandrel in FIGURES 2 and 3, a plurality of rolls of tape can be simultaneously wound about the same mandrel. The same is true with respect to the filler tape F. Moreover, the tape of each roll need not be of the single ply construction shown. For example, a folded tape could be employed in which a single ply tape of double width is slit on opposite sides of its longitudinal center line in a manner similar to that indicated above and then folded on itself about such center line. With such a construction corresponding slits on opposite sides of the double width tape could be staggered to insure that the slits will not align with each other when wound on the mandrel.

In FIGURES 8 and 9 there is illustrated a preferred form of a tape T embodying the principles of the present invention. The tape is formed from a fabric 130 or the like, which fabric is composed of interwoven strands extending at right angles with respect to each other in accordance with conventional fabric making procedures. Of course, these strands may be made up of suitable fibers of the type described above. Preferably, the fabric is then impregnated with a resin of the type described above. From the fabric a bias-cut tape 132 is formed in accordance with conventional procedures for the manufacture of bias-cut tape. One such procedure involves the formation of a sleeve of spirally wound fabric in which the abutting edges of the spirally formed fabric are sewn together. Subsequently the tube of spirally secured together fabric is slit longitudinally to form the tape. Alternatively, the tape may be spirally cut from a straight fabric sleeve. In FIGURE 8 the fabric 130 is shown as having a tape 132 cut therefrom along a substantially 45° angle. It will be understood that the tape may be impregnated after its formation although where impregnated prior to formation the impregnating resin aids in preventing undesirable distortion during the fabrication of the tape.

It is characteristic of bias-cut tape that it will stretch longitudinally and during such longitudinal stretching the width or transverse dimension will decrease. In order to be able to handle such tape and to wind it onto the mandrel in accordance with the present invention, one longitudinal edge portion of the bias-cut tape is made substantially non-extensible. Various arrangements may be empolyed for rendering the one longitudinal edge portion substantially non-expansible. As shown, the tape is stitched along one longitudinal marginal edge portion as indicated at 134, the stitching providing resistance to expansion when longitudinally stressed. The opposite edge portion of the tape remains free so that it is capable of expansion when placed under longitudinal tension. The provision of stitching along one longitudinal edge portion of the bias-cut tape or some other means for rendering the edge portion resistant to longitudinal stress is essential in order to properly feed the tape onto the mandrel. Thus, because tension is applied to the tape as it is wound about the mandrel, the non-expansible longitudinal edge portion permits the tape to be fed onto the mandrel so that the edge portion will conform to the surface 38 of the mandrel and the remaining portion will arcuately fan out in its own plane.

It has been found that the expansion characteristics of bias cut tape for present purposes can be improved if, prior to the application of the stitching indicated above, the tape is initially compressed. One simple procedure for forming a tape of this type is to sew or otherwise secure the web of material into sleeve formation, the longitudinal edges of the sleeve being displaced with respect to each other axially and then cutting helical strips from the sleeve thus formed. Bias cut tape which is initially compressed before stretching, as indicated above, provides for considerably more expansion, since the inclined angle between the strands is less than 90° and upon the application of longitudinal stress will expand through the 90° relationship and beyond. Moreover, it is sometimes desirable to make the bias cut at an angle somewhat less or somewhat greater than 45°.

Another example of a tape that would satisfy the essential characteristics of the present invention is one made from braided sleeves. Such sleeves are essentially a specific form of biased cut tape although they are not technically "cut."

It will be understood that in the normal operation of the machine, the tape is secured adjacent the lower periphery of the mandrel as by a starting ring 136 or the like (see FIGURE 1), and upon actuation of the motor 30 to rotate the mandrel the tape will be wound about the mandrel in helical formation. In this regard, it will be noted that the inner ends of the elongated members 62 engage the surface of the mandrel just above the layer of tape being wound thereabout. In this way, the elongated members will follow the contour of the surface of the mandrel about which the tape is wound. That is, if the radius of the surface becomes less, the elongated members contacting the surface will move radially inwardly under the action of the springs 64. Conversely, if the radius of curvatures becomes greater, the associated elongated member will move outwardly against the action of the springs.

The vertical movement of the tape-handling mechanism is timed in relation to the rotation of the mandrel so that the shoe elements 116 will apply a proper amount of pressure to the tape being wound. Any suitable means may be provided for interrelating the drive of the mandrel with the drive to the vertical threaded shafts 72. As shown, the variable speed drive transmissions 32 and 95 may be suitably manually adjusted to accommodate the particular tape being wound. Of course, where two or more tapes are simultaneously wound about the same mandrel the vertical movement of the tape-winding mechanism for any given mandrel speed will be greater than would be the case when a single tape is being wound.

It will be noted that with a frusto-conical mandrel, such as illustrated in FIGURE 1, the elongated members will progressively move radially inwardly as the mechanism moves upwardly. This insures that the lower surface of the shoe elements 116 will be in proper relation to apply pressure to the tape being wound about the mandrel. Where a cylindrical mandrel is employed it is possible to lock the elongated elements 62 against radial movement in a position spaced slightly outwardly from contact with the mandrel as by collars or the like fixed to the members by set screws and positioned to engage the outer surface of the ring 56.

Figure 10:
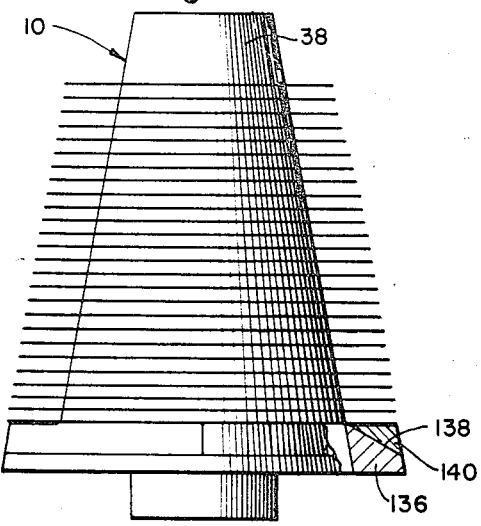
FIGURE 10 is a side elevational view, partly in section, showing the mandrel with the helically wound tape positioned thereon.
Figure 14:
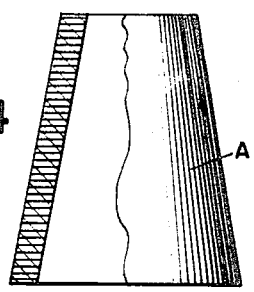
FIGURE 14 is an elevational view partly in vertical section of a finished article embodying the principles of the present invention.

Referring now more particularly to FIGURES 10–4, after the tape has been wound onto the mandrel, suitable pressure is applied to the helical laminations causing the resin which impregnates the tape to fuse together and substantially fill all voids in the structure. Preferably, the resin with which the fibrous material is impregnated is of a curable thermosetting type as indicated above. Thus, by the application of heat along with the pressure the resin is cured rendering the entire resin matrix of a uniform consistency. The article, indicated at A in FIGURE 14, in its cured condition is essentially a solid comprising a body of cured resin having at least one helically wound, substantially continuous tape of fibrous material embedded therein. Heating is not essential for curing. Thus polyethylene can be cured by the use of sufficient irradiation. e.g. with electrons to a dosage of $100 \times 10^6$ rep to $200 \times 10^6$ rep.

Figure 11:
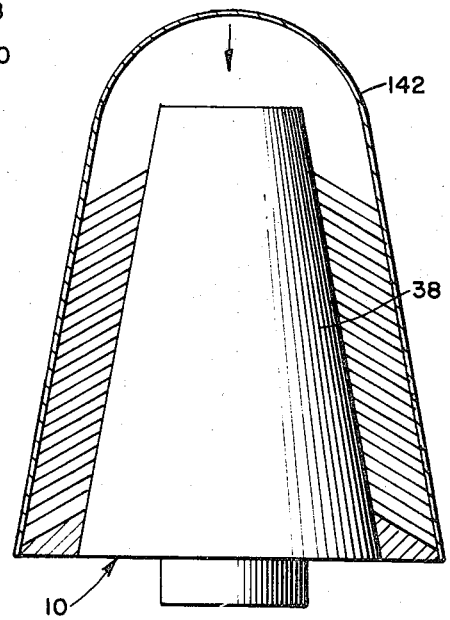
FIGURE 11 is a vertical sectional view illustrating one embodiment of a pressure-applying means for molding the helically wound tape on the mandrel.

As shown in FIGURE 1, the starting ring 136 is mounted on the lower end of the mandrel for receiving the first layer of tape in a plane perpendicular to the axis of the mandrel. In some cases, it is desirable to orient the layers of tape along parallel planes which are disposed at an angle with respect to a plane perpendicular to the axis of the mandrel. For example, if the hollow article being formed constitutes a nozzle it has been found desirable to orient the layers of the tape so that they converge inwardly in the direction of convergence of the nozzle. To this end, the starting ring 136 may include a frusto-conical upwardly-facing surface 138 in which event a removable split ring 140 having a corresponding downwardly-facing frusto-conical surface is mounted in engagement with the ring 136 (see FIGURE 10). In making such an article, the split rings 140 are removed after the tape has been wound on the mandrel and then pressure is applied to the outer periphery of the layers by any suitable means as, for example, by placing an outer forming member 142 provided with an inner frusto-conical surface about the periphery of the wound mandrel. As shown in FIGURE 11, the member 142 can then be moved downwardly onto the laminations of tape wound about the mandrel to provide sufficient forming pressure.

While it is preferred to feed the slit tape onto the mandrel with its surface substantially perpendicular to the axis of the mandrel, when using bias-cut tape the angle of feed need not be perpendicular to the axis of the mandrel. Therefore, in making an article in which the layers are angularly oriented, the feed angle may more closely approximate that of this desired final angle. In this case the upper surface of the split ring will be frusto-conical.

Figure 12:
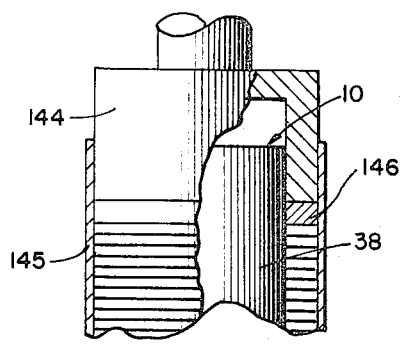
FIGURE 12 is a fragmentary cross-sectional view illustrating one embodiment of a retainer ring utilized in molding the tape after the same has been wound on the mandrel.

In the case of cylindrical articles pressure may be applied by straight longitudinal compression such as with a ring-shaped plunger 144 of a press having a cylinder 145 arranged to receive the wound mandrel, as indicated in FIGURE 12. Preferably, a compression ring 146 is positioned between the lower end of the plunger and the upper surface of the tape. This procedure for applying a forming pressure to the laminated tape is desirable, since it serves to maintain the alignment of the layers. Where the laminations are to be oriented in a direction extending at an angle from a plane perpendicular to the axis of the mandrel, the ring-shaped plunger could be made to act upon a compression ring having a frusto-conical lower tape-engaging surface.

Figure 13:
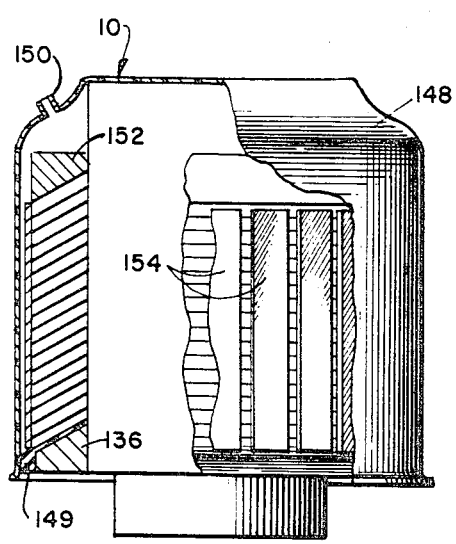
FIGURE 13 is a view similar to FIGURE 12 illustrating another embodiment of the pressure-applying means for molding the tape after it has been wound.

It will be understood that other means may be provided for applying suitable forming pressure to the tape laminations on the mandrel. In FIGURE 13 there is shown another embodiment wherein the tape wound mandrel is placed within a flexible bag 148. The bag is preferably made of neoprene, polyethylene or some other suitable material which has sufficient strength and is gas-tight. As shown in FIGURE 13, the bag substantially surrounds the tape-wound mandrel and is made air-tight therewith by the provision of an extrudable sealing material 149 applied to the tape wound mandrel adjacent the ring 136. The air is evacuated from the bag by applying a suitable vacuum source to a suitable outlet 150 formed in the bag. The evacuation of the air within the bag causes the pressure acting on the exterior surface of the bag to apply a forming pressure to the periphery of the tape wound about the mandrel. Preferably, an upper forming ring 152 is mounted on the upper end of the tape in fixed relation to the mandrel to prevent longitudinal expansion of the laminated tape as the peripheral pressure is applied by the evacuation of the bag. In some instances, it is advantageous to apply a plurality of circumferentially-spaced slats 154 to the periphery of the tape prior to mounting the bag thereover. In this way, a more uniform peripheral pressure is applied to the tape.

As indicated above, the application of pressure, and in most instances heat, causes the resin impregnated in the tape to fuse together and form a substantially solid resin matrix which is preferably cured. Of course, imbedded within this matrix is one or more helically wound substantially continuous tapes of fibrous material. The article A shown in FIGURE 14 therefore acts as a solid and may be machined or otherwise worked, much the same as any solid material.

It has been found that a hollow body or article produced in accordance with the present invention is highly resistant to deterioration from the extreme friction and temperature conditions prevalent in rocket operations. The layer orientation of the fibers within the fused mass of resin in the finished article provides tremendous strength per unit of weight. Moreover, the orientation of the layers resists peeling off of the material due to wind and surface friction. The present construction is superior to prior art construction in which the article is built up of a multiplicity of separate rings of fibrous material laminated together, since by forming the laminations in a continuous spiral or helical arrangement there is an effective connection between each layer which is not present in the conventional built-up ring layer formation. Moreover, it is apparent that the feeding of a roll of tape in continuous helical formation around a mandrel constitutes a much more economical method of manufacture than does the building up of separate rings into a multiplicity of laminations to form a product.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. Apparatus for forming a hollow article from a tape of fibrous material impregnated with resin having a substantially non-expandable longitudinal marginal edge portion and a remaining portion expansible longitudinally comprising a mandrel, a frame having a plurality of elongated members mounted thereon in circumferentially spaced relation about said mandrel for substantially radial movement toward and away from said mandrel, spring means resiliently urging said members radially inwardly toward the exterior surface of said mandrel, means carried by said frame for feeding said tape from a roll between an adjacent pair of said members onto said mandrel with the non-expansible edge portion thereof adjacent the exterior surface of said mandrel and the remaining portion extending transversely outwardly therefrom, means for effecting a relative rotational movement between said frame and said mandrel about the axis of the latter and means for effecting a relative axial movement between said mandrel and said members in timed relation to said relative rotational movement.

2. Apparatus as defined in claim 1 wherein each of said elongated members has a tape engaging shoe element mounted on the inner end thereof.

3. Apparatus as defined in claim 2 wherein each of said shoe elements comprises a flat strip having a first portion secured to the end of the associated elongated member and a second portion extending substantially horizontally outwardly from the associated member.

4. Apparatus as defined in claim 3 wherein the second portions of the shoe elements secured to adjacent elongated members overlap each other.

5. Apparatus as defined in claim 1 wherein said mandrel is frusto-conical.

6. Apparatus for forming a hollow article from a tape of fibrous material impregnated with resin having a substantially non-expansible longitudinal marginal edge portion and a remaining portion expansible longitudinally comprising a mandrel having a longitudinal axis, means mounting said mandrel for rotational movement about its axis, a tape-handling carriage including an annular member disposed in surrounding relation to said mandrel, means mounting said annular member for longitudinal movement with respect to the axis of said mandrel, a plurality of elongated bars mounted on said annular member in circumferentially-spaced relation about said mandrel for substantially radial movement toward and away from the exterior surface of said mandrel, spring means resiliently urging said bars radially inwardly toward the exterior surface of said mandrel and means carried by one of said bars operable in response to the rotational movement of said mandrel and the longitudinal movement of said annular member for feeding said tape from a roll between an adjacent pair of said bars onto said mandrel in helical formation with the substantially non-expansible edge portion thereof adjacent the exterior surface of said mandrel and the remaining portion extending transversely outwardly therefrom.

7. Apparatus as defined in claim 6 wherein said annular member comprises a pair of rings maintained in spaced relation by an integral connecting disk.

8. Apparatus as defined in claim 6 wherein each of said bars has a flat shoe element mounted on the inner end thereof, said shoe elements overlapping each other to provide a substantially continuous annular tape guiding surface.

9. Apparatus as defined in claim 6 including variable speed means for rotating said mandrel and independent variable speed means for moving said annular member longitudinally with respect to the axis of said mandrel.

10. A machine for forming relatively thick walled structures having the form of a surface of revolution about a central axis and consisting of a fiber reinforced resinous body, the fibers in which are disposed in the form of ring laminations having a selected angle to the axis of the surface of revolution, the machine including in combination a rotatable central form having the approximate dimensions desired for the inner surface of the surface of revolution, the central form including a lay-up portion extending at the angle desired for the direction of laminations from the central axis, means for feeding deformable strips of resin coated fibers to the vicinity of the central form, a carriage mechanism movable at a selected controlled rate of speed proportioned to the speed of rotation of the central form but less than the rate of build-up of the strips on the central form and adjacent to the central form, means coupled to the carriage mechanism and coupled to receive the strips for feeding the strips onto the central form to be wound thereabout, and pressure elements coupled to the carriage and movable therewith and extending into the path of the strips which are being laid on to exert a uniform pressure on the strips in a direction substantially normal to the direction of the lamination during the entire build-up of said strips into said body.

11. A machine for forming structures in the configuration of surfaces of revolution which consist of fiber reinforced structures in which the fibers lie in laminations at a selected angle relative to the central axis of the surface of revolution, the machine including in combination a rotatable central form, means providing strips of fiber material to be wound into the reinforced structure, a carriage structure movable along the rotatable central form at a controlled rate related to the speed of rotation of the central form, and a strip feed and pressure mechanism coupled to the carriage and movable therewith, the strip feed and pressure mechanism being adapted to exert uniform pressure on the strips during the entire winding of the strips on the rotatable central form and including means disposed tangentially to the rotatable central form for receiving the strips of fiber material and disposing the same edgewise and circumferentially about the rotatable central form, the controlled rate of movement of the carriage structure being less than the rate of material build-up on the central form.

12. A device for the control of the winding of strips of fiber material having a resin coating which includes a form on which the strips are to be wound, guide means for feeding the strips edgewise and tangentially to the form, and a plurality of pressure means disposed at successive points along the path of a turn of strip being added on and adapted to move along the line of build-up of said strip at a controlled rate proportional to but slightly less than the rate of build-up of the strips on the form so as to exert uniform pressure on said strip during the entire build-up of said strip, each of the pressure means maintaining a pressure to cause adjacent turns of the strip to adhere to each other to produce a partially densified structure.

References Cited

UNITED STATES PATENTS

| | | | |
|---|---|---|---|
| 2,792,324 | 5/1957 | Daley et al. | 154—83 |
| 2,932,597 | 4/1960 | St. John et al. | 154—83 |
| 2,718,915 | 9/1955 | Piazze | 154—1.8 |
| 2,733,753 | 2/1956 | Schlesselman et al. | 154—1.8 |
| 2,835,107 | 5/1958 | Ward | 60—35.6 |
| 2,876,620 | 5/1959 | Weinland et al. | 60—35.6 |
| 2,190,711 | 2/1940 | Hanson | 117—11 |
| 2,819,180 | 1/1958 | Koenig | 117—11 |
| 2,558,849 | 7/1951 | Hodge | 93—80 |
| 2,905,578 | 9/1959 | Rees et al. | 154—90 |
| 2,213,290 | 9/1940 | Rowe | 93—80 |
| 1,674,171 | 6/1928 | Gammeter et al. | |
| 2,776,698 | 1/1957 | Kreger | 93—80 X |
| 2,950,152 | 8/1960 | Garceau | 156—195 X |

FOREIGN PATENTS 407,876  3/1934  Great Britain.

EARL M. BERGERT, *Primary Examiner.*

P. DIER, *Assistant Examiner.*